United States Patent
Wang (10) Patent No.: US 6,914,744 B1
(45) Date of Patent: Jul. 5, 2005

(54) MITIGATING THE EFFECTS OF INOPERABLE SERVO READERS USED FOR DATA TRACK POSITIONING ON TAPE DRIVES

(75) Inventor: Linus Wang, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 28 days.

(21) Appl. No.: 10/731,309

(22) Filed: Dec. 9, 2003

(51) Int. Cl.[7] ............................................. G11B 5/584
(52) U.S. Cl. ........................ 360/77.12; 360/31; 360/25
(58) Field of Search ............................. 360/77, 12, 53, 360/31, 76, 75, 63, 25; 324/210, 212, 226; 714/771; 369/53.1

(56) References Cited

U.S. PATENT DOCUMENTS

| | | | | |
|---|---|---|---|---|
| 5,353,176 A | * | 10/1994 | Kosuge | ........................ 360/63 |
| 6,243,225 B1 | * | 6/2001 | Wyman et al. | .......... 360/77.12 |
| 6,690,535 B2 | * | 2/2004 | Wang | ....................... 360/77.12 |
| 6,757,128 B2 | * | 6/2004 | Yip | ........................... 360/77.12 |
| 6,781,784 B2 | * | 8/2004 | Peterson | ...................... 360/76 |

OTHER PUBLICATIONS

U.S. Appl. No. 09/751,575, filed Dec. 29, 2000, Wang, Using Component Position Error Signals (PES) to Measure Tape Distortion.

* cited by examiner

Primary Examiner—Alan T. Faber
(74) Attorney, Agent, or Firm—Yee & Associates, P.C.

(57) ABSTRACT

A method, system and program for mitigating the effects of one or more inoperable servo readers used for data track positioning on a tape drive are disclosed. A track following servo system can compensate for an inoperable servo reader by collecting and measuring tape distortion information from the tape involved. The track following servo system can quantify the tape distortion information and produce a tracking offset value. The track following servo system can then position an operable servo reader over the tape with the compensating offset value applied.

20 Claims, 5 Drawing Sheets

MITIGATING THE EFFECTS OF INOPERABLE SERVO READERS USED FOR DATA TRACK POSITIONING ON TAPE DRIVES

RELATED APPLICATIONS

The present application is related by subject matter to commonly assigned, co-pending U.S. patent application Ser. No. 09/751,575 entitled "USING COMPONENT POSITION ERROR SIGNALS (PES) TO MEASURE TAPE DISTORTION", filed on Dec. 29, 2000, and hereby incorporated by reference.

BACKGROUND OF THE INVENTION

1. Technical Field

The present invention relates generally to an improved data recording system, and in particular, but not exclusively, to a system and method for mitigating the effects of inoperable servo readers used for data track positioning on tape drives.

2. Description of Related Art

Tape drives are peripheral mass storage devices often used to archive data on tapes for later access. Tape drives are also used as random access devices in data storage applications where the cost of storage might be important and access time is of less significance. For example, many banks and financial institutions, insurance companies, and government agencies may use tape drives with applications regarding clients, accounts, patients, and other items of interest. In other applications, huge amounts of data are stored directly on tape for later retrieval and analysis.

In accessing data on a tape, a read or write head in a tape drive is positioned over one or more tracks on the tape. Typically, two or more servo tracks on the tape are used for aligning the read or write head to the tracks containing the data. For example, servo control information can be located in the servo tracks. This servo control information can be a repeating pattern of magnetic flux transitions. Alternatively, optical servo tracks may be found on the tape. Servo readers read the servo control information from the servo tracks on the tape, and generate position signals used to control the positions of associated data read and write heads over tracks containing the data.

If a read or write head drifts from an optimal position relative to a track on the tape, a servo reader generates an error signal. The error signal increases as the read or write head drifts further from the optimal location relative to the data on the track. If the read or write head drifts too far relative to the data on the track, errors and data recovery problems occur in accessing the tape. Existing systems adjust the position of the read or write head, or the position of the tape relative to the read or write head, to minimize the error signal generated by the servo reader during access of the tape.

Evidence indicates that, over time, tape dimensions are distorted over the length of the tape. In addition, such tape distortion can worsen with a combination of time, temperature, and use. As such, significant problems result from tape distortion. For example, the data tracks on a tape can shift position relative to the data read and write heads, resulting in the loss or overwriting of data. Also, distorted servo tracks can degrade the ability of the tape servo system to acquire and follow the servo tracks, resulting in degraded performance. Notably, these tape distortion problems are exacerbated if a servo reader becomes inoperable. The temporary or long term loss of a servo reader compromises the quality of the position error information received by the tape servo system, which in turn, compromises the effectiveness of the servo system's track alignment or track following ability. Ultimately, the combined problem of tape distortion and compromised track alignment or track following ability significantly increases the probability of data loss.

For example, assume (for illustrative purposes) that a conventional read/write head assembly includes two operable servo readers. The head assembly may contain a columnar arrangement of elements including, for example, an upper servo reader, a lower servo reader, and a plurality of data read/write elements located between the servo readers. With two servo readers, the track following operation for a distorted tape is typically a compromise. One servo reader is positioned "high" relative to a servo pattern being tracked, and the other servo reader is positioned "low". As a compromise, the two servo readers "split the difference" for the track following error, in order to minimize the tracking offsets for the data read and write elements involved.

If one of the servo readers becomes inoperable, the servo system cannot position the read/write head assembly in an optimal, compromise location. Consequently, the data read and write elements located near the operating servo reader typically follow their respective data tracks closely. However, the read/write data elements located farther away from the operating servo reader typically have tracking offsets that substantially reflect the distortion of the tape.

For example, each servo reader tracks a respective servo stripe on the tape. Using two servo readers, if the amount of tape distortion between the two servo stripes is expressed as a distance value, N, then the optimal position of the read/write head assembly is with one servo reader located at $+N/2$ and the other servo reader located at $-N/2$. In this case, the data read/write elements located midway between the servo readers track very well with little or no offset. However, the data read/write elements nearest the servo readers can be misaligned with an offset as large as $N/2$. Under these conditions, and now assuming that the lower servo reader has failed, the upper servo reader can still track its servo pattern very well with little or no offset. Also, the data read/write elements located nearest the upper servo reader can track very well. However, the data read/write elements located nearest the lower, inoperable servo reader are misaligned by a factor of N. As such, if one of two servo readers fails, and a distorted tape is also involved, then the data read/write elements can be misaligned with an offset difference factor as high as 2.

Therefore, it would be desirable to have a method and system for mitigating the effects of inoperable servo readers used for data track positioning on tape drives.

SUMMARY OF THE INVENTION

The present invention provides a method, system and program for mitigating the effects of one or more inoperable servo readers used for data track positioning on a tape drive. A track following servo system can compensate for an inoperable servo reader by collecting and measuring tape distortion information from the tape involved. The track following servo system can quantify the tape distortion information and produce a tracking offset value. The track following servo system can then position an operable servo reader over the tape with the compensating offset value applied.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
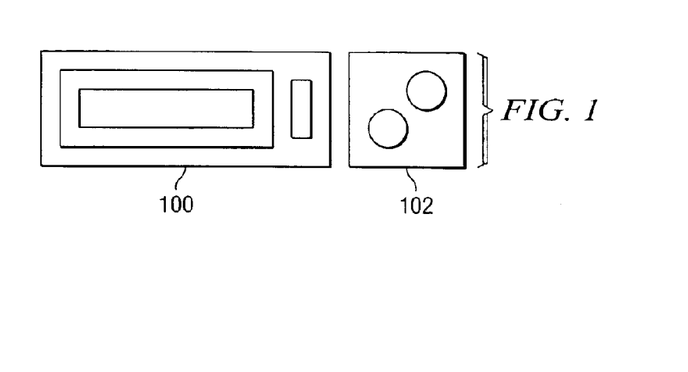
FIG. 1 depicts a diagram illustrating a tape drive system in which the present invention may be implemented.

With reference now to the figures and in particular with reference to FIG. 1, a diagram of a system is illustrated in which the present invention may be implemented. A tape drive system 100 is configured to receive a tape cartridge, such as tape cartridge 102, which contains a housing with a loop of tape wound on one or more reels in the housing. Tape drive system 100 may be used for a variety of applications. For example, tape drive system 100 may be used as a stand-alone unit within a computer to provide backup. Additionally, tape drive system 100 also may be used within a robotic tape cartridge handling system to receive tape cartridges handled by robotic arms. In such a case, tape drive system 100 is a stand-alone system in which a separate controller is present for handling the accessing of tapes. Information may be retrieved from such a system for use by a computer.

In this example, the tape in tape cartridge 102 contains servo control information located in tracks on the tape. Typically, this information is a repeating servo pattern of magnetic flux transitions. Alternatively, optical servo tracks also may be found on the tape. Tape drive system 100 can read servo control information and generate a position signal used to control the position of an associated data read head within tape drive system 100. Servo control information may be written onto the tracks using a servo write head. Tape cartridge 102 may take a variety of formats, such as, for example, 8 mm, 4 mm, ¼ inch, and ½ inch formats.

Figure 2A:
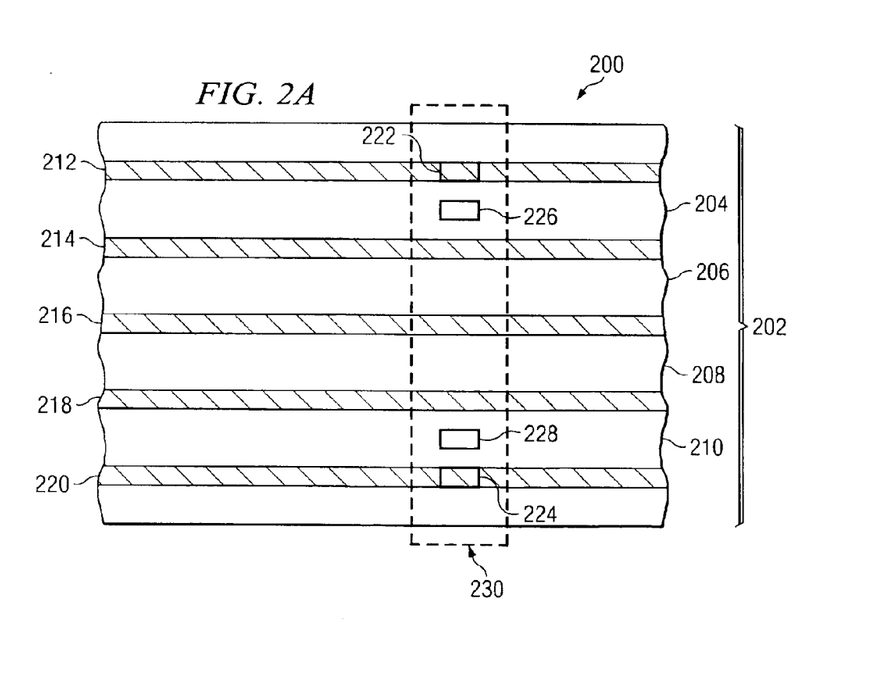
FIGS. 2A–2C depict related schematic diagrams of tapes and servo tracks that may be used to illustrate principles of the present invention.

With reference to FIG. 2A, a diagram illustrating a tape and servo tracks is depicted that may be used to illustrate principles of the present invention. Tape 200 has a width 202. For this example, it may be assumed that tape 200 is undistorted (e.g., tape distortion=N=0). Tape 200 includes data stripes 204, 206, 208, 210 in which one or more data tracks are located. Also, servo tracks 212, 214, 216, 218, 220 are found on tape 200. As illustrated, servo tracks 212, 214, 216, 218, 220 are magnetic tracks, but may take other forms, such as, for example, optical tracks. In this example, five servo tracks are shown for purposes of illustrating the principles of the present invention. Depending on the implementation, other numbers of servo tracks may be found.

Servo read elements 222, 224 are located within head 230. These servo read elements or transducers, also referred to as "servo read heads" or "servo readers", are found within read/write head assembly 230 in this example. Also, in this example, data read/write elements or transducers 226, 228 are found within read/write head assembly 230. Data read/write elements 226, 228 are positioned over data stripes 204, 210, respectively.

Servo readers 222, 224 are positioned over servo tracks 212, 220 in this example. Note, within the principles of the present invention, that the terms "positioned, positioning, positioned, position" may be defined to include an operation of acquiring a track and/or following a track. Also, for illustrative purposes, servo readers 222, 224 are shown positioned over outermost servo tracks 212, 220. However, the present invention is not intended to be so limited, and the servo readers used (e.g., 222, 224) may be positioned over any servo tracks or combination of servo tracks on the tape used (e.g., 200).

These servo tracks may employ various patterns or frequency regions to allow precise tape-to-tape head positioning to allow for more accurate access of data from data tracks. The servo control system in a tape drive generates a position error signal based on differences in signal amplitudes generated by servo readers 222, 224. Also, signal phase or timing difference data may be used to generate a position error signal. The position error signal is used to align read/write head assembly 230 with tape 200.

Essentially, FIG. 2A illustrates an accurate alignment of read/write head assembly 230 with an undistorted tape (e.g., N=0). In this example, it may be assumed that both servo readers 222, 224 are operable and accurately tracking their respective servo tracks 212, 220. Consequently, with undistorted tape 200, both data read/write elements 226, 228 are accurately positioned over their respective data stripes 204, 210. In this case, no positioning compensation for tape distortion has to be applied.

Figure 2B:
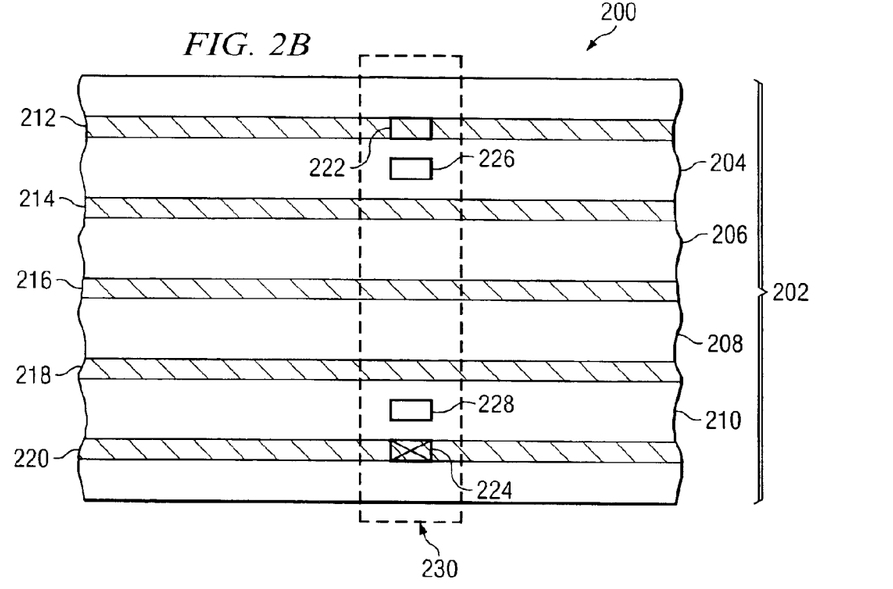

With reference now to FIG. 2B, another diagram illustrating a tape and servo tracks is depicted that may be used to illustrate principles of the present invention. Again, it may be assumed that tape 200 is undistorted (e.g., N=0) and has width 202. However, for this example, it may be assumed that (upper) servo reader 222 is operable, and (lower) servo reader 224 is inoperable (e.g., as indicated by the cross-hatched lines). Notably, although servo reader 224 is inoperable, servo reader 222 is still operable and can accurately follow its servo track 212. Consequently, as illustrated by FIG. 2B, with an undistorted tape and one inoperable servo reader, data read/write elements 226, 228 can still be accurately positioned over data stripes 204, 210.

Figure 2C:
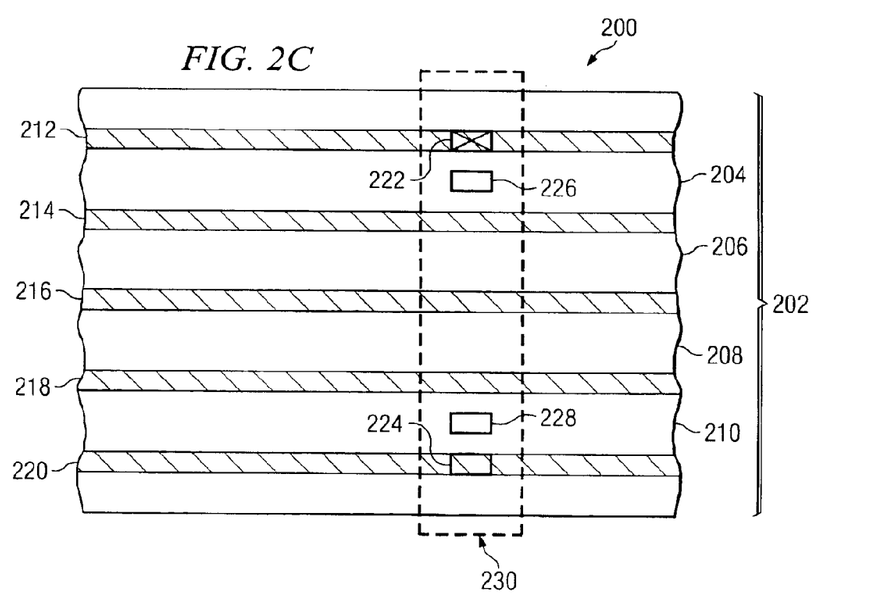

With reference now to FIG. 2C, another diagram illustrating a tape and servo tracks is depicted that may be used to illustrate principles of the present invention. Again, it may be assumed that tape 200 is undistorted (e.g., N=0) and has width 202. However, for this example, it may be assumed that (lower) servo reader 224 is operable, and (upper) servo reader 222 is inoperable (e.g., as indicated by the cross-hatched lines). Note, in this case, that although servo reader 222 is inoperable, servo reader 224 is still operable and can accurately track its servo track 220. Once again, as illustrated by FIG. 2C, with an undistorted tape and one inoperable servo reader, data read/write elements 226, 228 can still be accurately positioned over data stripes 204, 210.

Figure 3A:
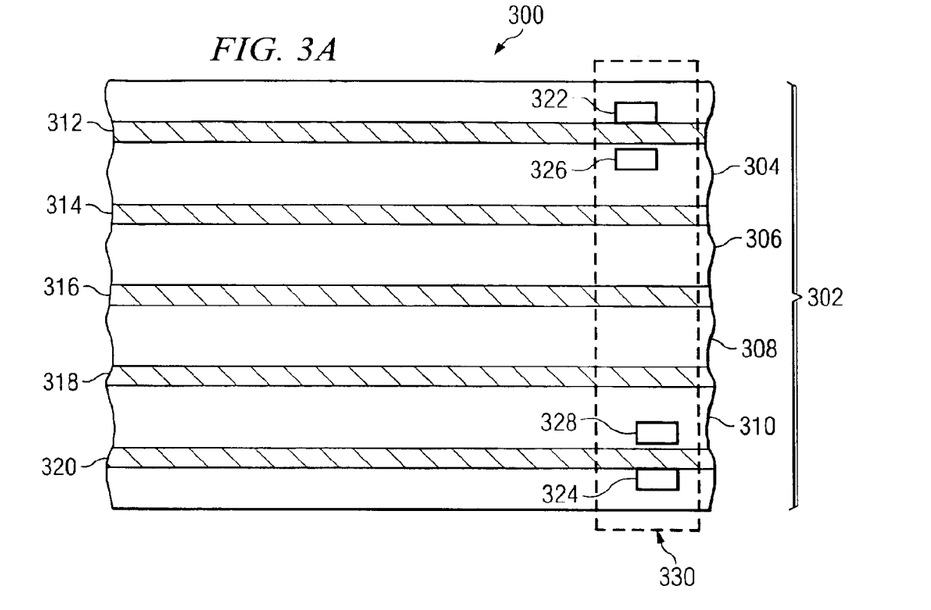
FIGS. 3A–3D depict related schematic diagrams illustrating tapes and servo tracks in accordance with a preferred embodiment of the present invention.

With reference now to FIG. 3A, a diagram illustrating a tape and servo tracks is depicted that may be used to illustrate principles of the present invention. For this example, it may be assumed that tape 300 is distorted (e.g., tape distortion=N). Possibly, the tape has stretched over a period of time and, therefore, the width of the tape has decreased. In other words, tape 300 is narrower than tape 200 by an amount, N. As such, in this illustrative example, tape 300 has width 302 that is equal to width 202 of tape 200 in FIGS. 2A–2C minus the tape distortion value, N.

Tape 300 includes data stripes 304, 306, 308, 310 in which one or more data tracks are located. Also, servo tracks 312, 314, 316, 318, 320 are found on tape 300. As illustrated, servo tracks 312, 314, 316, 318, 320 are magnetic tracks, but may take other forms, such as, for example, optical tracks. In this example, five servo tracks are shown for purposes of illustrating principles of the present invention. Depending on the particular implementation involved, other numbers of servo tracks may be found.

Servo readers 322, 324 are found within read/write head assembly 330 in this example. Also, data read/write elements 326, 328 are found within read/write head assembly 330. Again, it may be assumed that tape 300 is distorted. Additionally, for this illustrative example, it may be assumed that both (upper) servo reader 322 and (lower) servo reader 324 are operable.

Note that with tape distortion and operable servo readers, data read/write elements 326, 328 can be positioned at their optimal read/write positions over data stripes 304, 310 using an offset of N/2. As such, the probability of data loss is relatively low for both read/write elements 326, 328 because of their optimal positioning over data stripes 304, 310.

However, FIG. 3A also illustrates that existing track following servo systems are unable to attain optimum positioning with tape distortion and only one operable servo reader. Furthermore, FIG. 3A illustrates that with only one operable servo reader, even if existing track following servo systems are somehow able to attain optimum track positioning with tape distortion, as the amount of tape distortion continues to change over time, the existing track following servo systems are unable to continue to determine and maintain an optimum track position from then on. As described below with respect to FIG. 3D, the present invention resolves this problem, and positioning compensation with tape distortion and an inoperable servo reader may be applied.

Figure 3B:
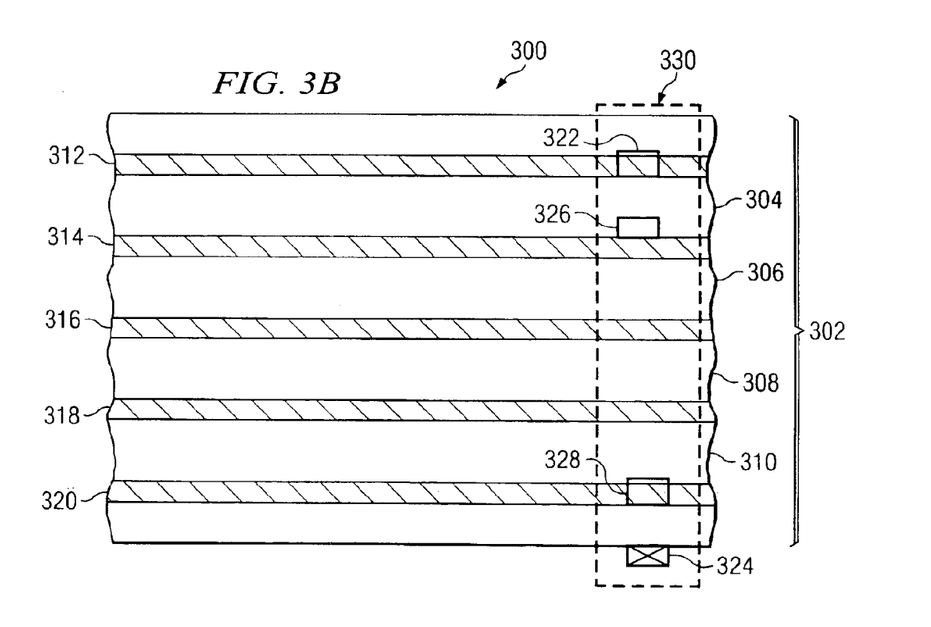

With reference now to FIG. 3B, a diagram illustrating a tape and servo tracks is depicted that may be used to illustrate principles of the present invention. For this example, again it may be assumed that tape 300 is distorted (e.g., tape distortion=N). In other words, tape 300 is narrower than tape 200 by the amount, N. Also, in this illustrative example, tape 300 has width 302 that is equal to width 202 of tape 200 in FIGS. 2A–2C minus the tape distortion value, N.

Tape 300 includes data stripes 304, 306, 308, 310 in which one or more data tracks are located. Also, servo tracks 312, 314, 316, 318, 320 are found on tape 300. As illustrated, servo tracks 312, 314, 316, 318, 320 are magnetic tracks, but may take other forms, such as, for example, optical tracks.

Servo readers 322, 324 are found within read/write head assembly 330 in this example. Also, data read/write elements 326, 328 are found within read/write head assembly 330. Again, it may be assumed that tape 300 is distorted. Additionally, for this example, it may be assumed that (upper) servo reader 322 is operable, but (lower) servo reader 324 is inoperable (e.g., as indicated by the cross-hatched lines).

Note that with tape distortion and an inoperable servo reader, that although servo reader 322 is operable and can accurately follow its servo track 312, data read/write elements 326, 328 are not accurately positioned over data stripes 304, 310. In fact, data read/write elements 326, 328 are offset from their optimal read/write positions over data stripes 304, 310 by a factor of N/2 (e.g., with respect to the optimum position illustrated in FIG. 3A). As such, the probability of data loss is relatively high for read/write element 326, because of it's offset (e.g., N/2) from the optimal position over data stripe 304, and possible signal interference from servo track 314. Furthermore, the probability that data will be lost is guaranteed for read/write element 328, because of it's offset (e.g., N/2) and positioning over servo track 320. In accordance with the present invention, and as described below with respect to FIG. 3D, positioning compensation for the tape distortion can be applied.

Figure 3C:
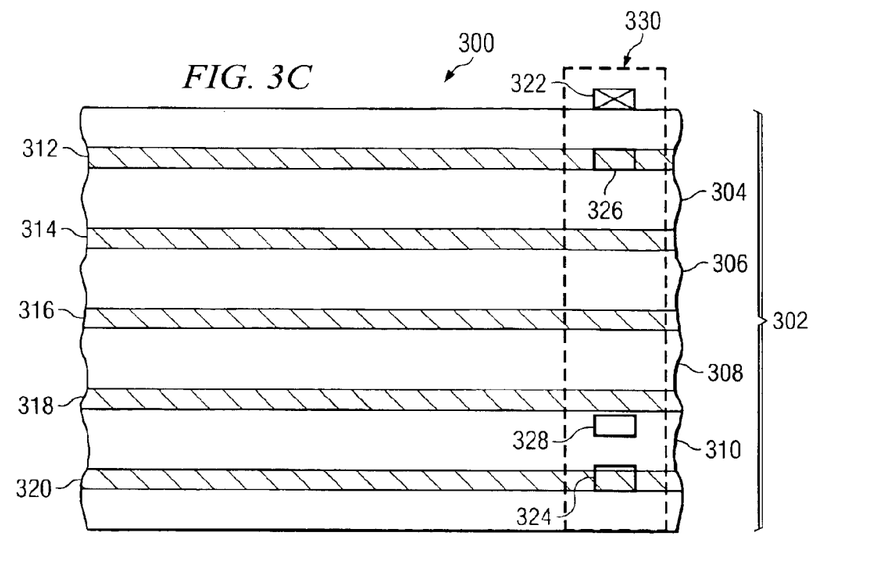

With reference now to FIG. 3C, a diagram illustrating a tape and servo tracks is depicted that may be used to illustrate principles of the present invention. For this example, again it may be assumed that tape 300 is distorted (e.g., tape distortion=N). Therefore, tape 300 has width 302 equal to that of tape 200 in FIGS. 2A–2C minus N. Additionally, for this example, it may now be assumed that (lower) servo reader 324 is operable, and (upper) servo reader 322 is inoperable (e.g., as indicated by the cross-hatched lines).

Note once again, with tape distortion and an inoperable servo reader, that although servo reader 324 is operable and can accurately follow its servo track 320, data read/write elements 326, 328 are again not accurately positioned over data stripes 304, 310. In fact, data read/write elements 326, 328 are offset from their optimal read/write positions over data stripes 304, 310 by a factor of N/2 (e.g., with respect to the optimum position illustrated in FIG. 3A). As such, the probability of data loss is relatively high for read/write element 328, because of it's offset (e.g., N/2) from the optimal position over data stripe 310, and possible signal interference from servo track 318. Furthermore, the probability that data will be lost is guaranteed for read/write element 326, because of it's offset (e.g., N/2) and positioning over servo track 312. In accordance with the present invention, and as described below with respect to FIG. 3D, positioning compensation for the tape distortion can be applied.

Figure 3D:
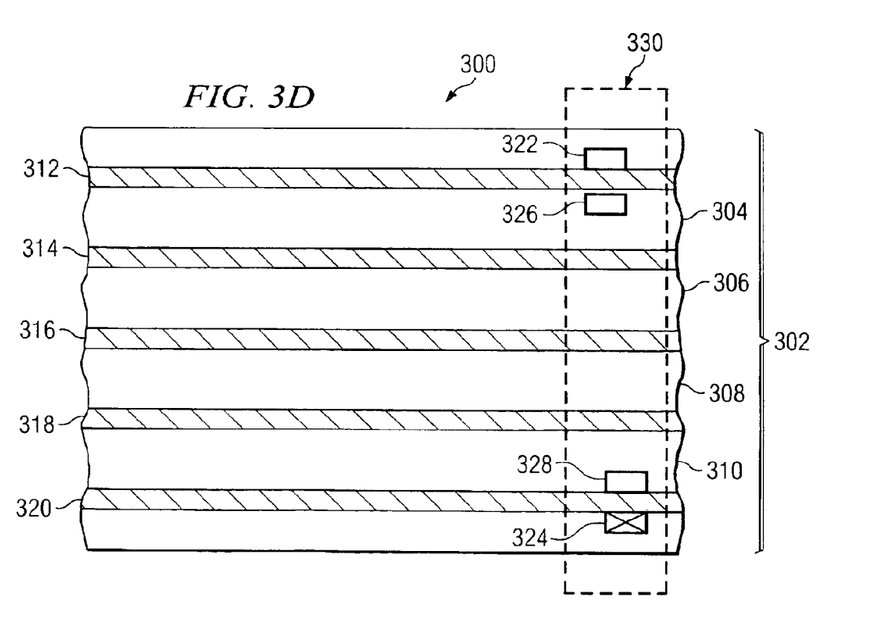

With reference now to FIG. 3D, a diagram illustrating a tape and servo tracks is depicted in accordance with a preferred embodiment of the present invention. For this example, again it may be assumed that tape 300 is distorted (e.g., tape distortion=N). Therefore, tape 300 has width 302 equal to that of tape 200 in FIGS. 2A–2C minus N. Additionally, for this example, it may now be assumed that (upper) servo reader 322 is operable, and (lower) servo reader 324 is inoperable (e.g., as indicated by the cross-hatched lines). As an alternative, in accordance with the present invention, the lower servo reader could be operable, and the upper servo reader could be inoperable. The particular arrangement and/or number of operable and inoperable servo readers are not intended as architectural limitations for the present invention. The principles of the present invention may be applied as well for tape drives using more than two servo readers for positioning one or more data read/write heads.

Essentially, in accordance with a preferred embodiment of the present invention, a track following servo system can compensate for an inoperable servo reader (e.g., 324) by collecting and measuring tape distortion information from the tape involved. The track following servo system can quantify the tape distortion information and produce a tracking offset value. The track following servo system can position the operable servo reader over the tape with the compensating offset value applied. Consequently, the tracking offset for the data read/write elements and probability of data loss are minimized.

For this exemplary embodiment illustrated in FIG. 3D, a track following servo system (not shown) can use one or more operable servo readers (e.g., 322 and/or 324) to collect tape distortion information over a period of time. For example, if both servo readers 322, 324 are operable (e.g., prior to a servo reader failure), during one or more initial passes of tape 300 under read/write head assembly 330, each servo reader 322, 324 can read servo tracking information from its respective servo track 312, 320. The track following servo system can quantify and store the servo tracking information received.

As tape 300 becomes more and more distorted over a period of time (e.g., N is increasing), the positioning errors for servo readers 322, 324 are increasing over the same period of time. The track following system can calculate a track following compensating offset value based on the historical positioning error information received. Thus, if a servo reader (e.g., 324 in this example) fails or has failed, then the track following servo system can position an operable servo reader (e.g., 322) over tape 300 with the track following compensating offset value applied.

For this example, it may be assumed that (lower) servo reader 324 becomes inoperable sometime after the initial pass or passes are performed. Also, it may be assumed that the track following servo system has used the received historical positioning error information to quantify and store information representing the tape distortion, N, for tape 300. The track following servo system can minimize the effects of the tracking offsets due to tape distortion, N, for data read/write elements 326, 328, by positioning operable servo reader 322 over tape 300 with a compensating offset value of N/2 (e.g., with respect to the optimum position illustrated in FIG. 3A). Advantageously, using a compensating offset value of N/2, the track following servo system can mimic a track following operation with tape distortion involved (e.g., as illustrated in FIG. 3A), which averages track following measurement information received from two operable servo readers. At this point, it is important to note that although an exemplary compensating offset value of N/2 has been described herein for illustrative purposes, the present invention is not intended to be so limited. In accordance with principles of the present invention, any appropriate compensating offset value can be used for optimum positioning of an operable servo reader over a tape with an inoperable servo reader and tape distortion involved.

In accordance with the present invention, a number of techniques may be used to measure and quantify tape distortion. For example, a second read/write head assembly with two operable servo readers may be used to read servo tracks 312, 320 or other servo tracks (e.g., 314, 318). The resulting tape distortion information can be used to position the operable servo reader of the first read/write head assembly over tape 300 with the compensating offset value (e.g., N/2) applied.

As another example, a second bump (e.g., read bump, write bump) with two operable servo readers arranged on read/write head assembly 330 may be used for measuring and quantifying tape distortion of tape 300. The tape distortion information thus derived may be used to position the operable servo reader of the first bump over tape 300 with the compensating offset value (e.g., N/2) applied.

As still another example, a sensor may be arranged in proximity to one or more edges of tape 300. As tape 300 becomes distorted over time, the edge sensor(s) can generate an analog signal over time whose magnitude represents the increasing distance between the sensor and the edge of the tape (e.g., tape distortion). Again, the resulting tape distortion information can be used to position the operable servo reader of read/write head assembly 330 over tape 300 with the compensating offset value (e.g., N/2) applied.

Additionally, a mathematical model that can predict tape distortion as a function of the age, use and/or position of the tape involved may be used to derive tape distortion. Also, tape distortion may be inferred from bit error rates (BERs) of individual data read/write elements. For example, as the width of a tape decreases, the BERs of data read/write elements typically increase.

Notably, in accordance with a preferred embodiment of the present invention, a plurality of servo readers may be used to collect component position error signal (PES) data from servo tracks on the tape involved. The separate PES data can be analyzed to determine tape distortion (e.g., N). The data can also be adjusted for reliability factors that might affect the confidence of the PES data. The distortion data for the tape can then be used to derive a compensating offset value (e.g., N/2) to be applied for positioning an operable servo reader over the tape involved.

Figure 4:
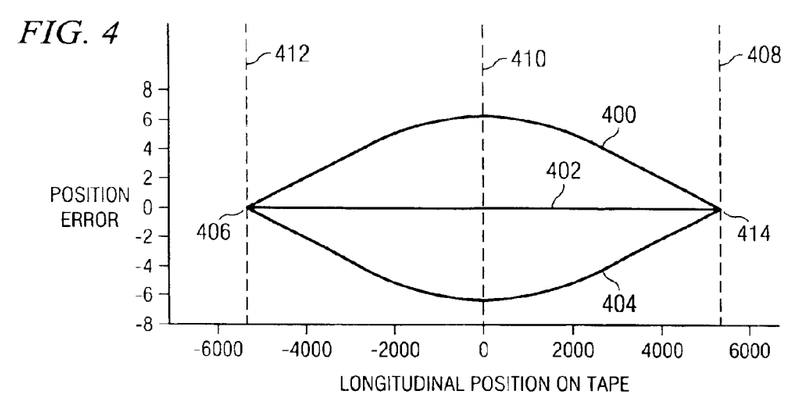
FIG. 4 depicts a schematic diagram illustrating servo position errors due to displacement of servo tracks in accordance with a preferred embodiment of the present invention.

In order to collect PES data from a tape, referring now to FIG. 4, a diagram of servo position errors due to displacement of servo tracks is depicted in accordance with a preferred embodiment of the present invention. In FIG. 4, the exemplary graph shows position error for a three-servo track tape drive system in a two-reel cartridge. In FIG. 4, line 400 represents data generated by an upper servo reader, line 402 illustrates data generated by a mid-position servo reader, and line 404 shows data generated by a lower servo reader. The tape, in this example, is located in a dual reel cartridge.

Lines 400, 402, and 404 illustrate servo position errors due to displacement on a tape. The vertical axis indicates the amount of position or displacement error. Various units may be used, such as micrometers, micro-inches, or volts depending on the measurement made. The magnitude of the vertical axis varies depending on factors, such as, for example, the size of the cartridge and the reels, the materials used, and the dimensions of the tape. The horizontal axis identifies the longitudinal position.

Specifically, the longitudinal position is an arbitrary, but fixed, measure of the physical locations lengthwise on the tape. The graph in FIG. 4 illustrates typical servo position error for a three-servo track system in a two-reel cartridge. The beginning of each line at vertical line 406 represents the beginning or one end of the tape. Vertical line 408 represents the other end of the tape, while the vertical line 410 represents the middle of the tape. The symmetrical nature of the graph in FIG. 4 stems from the fact that equal amounts of tape are normally stored on each of the two reels. If, on the other hand, the tape is normally stored on one of the two reels, the profile will eventually approach the shape of either the left or right half of FIG. 4 depending upon which reel the tape is stored. The time constant of this change will depend on a variety of factors, such as environment, usage, spool size, and tape type.

In reading a tape (e.g., tape 300 in FIG. 3D), the middle servo track is positioned directly under a particular servo read element. The upper servo track and the lower servo track are not aligned with the upper and lower servo readers except at crossover points 412 and 414 in FIG. 4. In FIG. 4, the illustrated signals are the inverse of the actual tape dimensions. These three lines illustrate a "bowtie" or "lips" effect, which is repeatable and predictable for a two-reel cartridge as the tape is played from one end to the other end.

In FIG. 4, although the tape is servo-written in a very controlled, parallel manner on the tape, compression and tension forces in the cartridge change the dimensions of this tape. In other words, in many cases the servo tracks written onto the tape from a large spool in which a length of tape is then placed on a reel in a cartridge. Servo tracks are written before spooling the tape onto a cartridge out of convenience so as to define the locations of the servo tracks in a very precise manner. Data is then written by a customer, and the data tracks are referenced in location to the servo tracks to uniquely define the positions of the data tracks.

Figure 5:
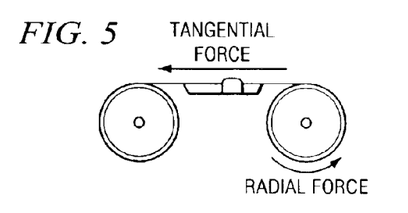
FIG. 5 depicts a schematic diagram illustrating compressive and tangential forces on a tape wrapped onto two spools in accordance with the present invention.

Referring now to FIG. 5, a schematic diagram illustrating compressive and tangential forces on a tape wrapped onto two spools is depicted in accordance with the present invention. When tape is wound around a reel, compressive forces tend to press out or increase the width of the tape. Compressive forces vary with position in the tape pack. These compressive forces, also referred to as radial forces, are decreased or removed when the tape is unwound from the reel. Although the compressive forces that cause the tape to widen are removed when the tape is unwound, the dimensional width change is residual. Tension and tangential forces also are present. These forces stretch the tape and cause the tape to become narrower. The interaction between the radial compressive and tangential, tensile forces give rise to the long-term dimensional variations of spooled tape. As a result of the different forces applied to the tape, the width of the tape will change. These types of forces result in dimensional variations in the tape and thus, track to element displacements as shown by the servo position error signals illustrated in lines 400, 402, and 404 in FIG. 4.

Figure 6:
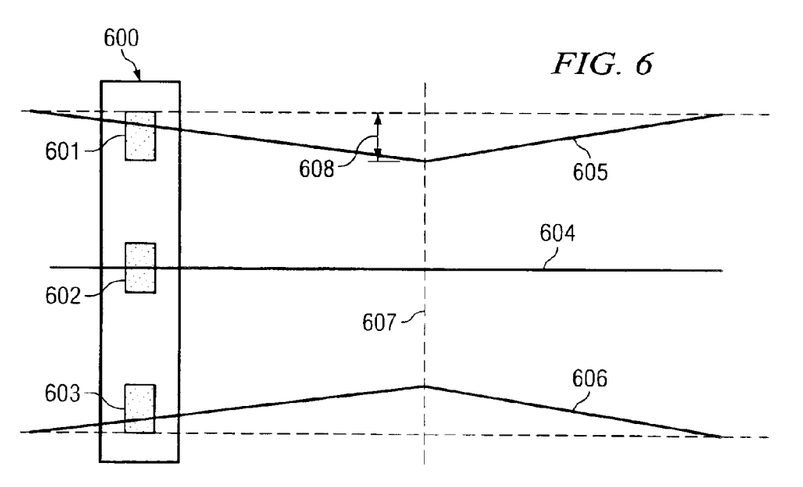
FIG. 6 depicts a schematic diagram illustrating the physical distortions in tape dimensions, resulting in a bowtie effect, in accordance with the present invention.

Referring to FIG. 6, a schematic diagram illustrating the physical distortions in tape dimensions, resulting in a bowtie effect, is depicted in accordance with the present invention. FIG. 6 shows three servo readers 601–603 positioned over three servo tracks 604–606. The upper servo reader 601 detects a roof shaped PES curve over the length of the tape, meaning the PES 608 is positive at center of tape (COT) 607. Since the tape head 600 is a solid, stable reference frame, the servo track 605 is low in relation to the upper servo reader 601. The opposite is true with the lower reader 603 and servo track 606. Therefore, the servo tracks 605 and 606 are distorted and the tape is narrower at COT 607 than at the ends. PES data 608 quantifies how much tape distortion (e.g., N) there is.

The present invention can be implemented as a software change to a tape drive servo system. For this exemplary embodiment, the present invention can collect, filter, compress, store and process component PES data in order to infer some of the physical characteristics of the tape. Thus, with this and the other above-described techniques, the track following system can measure and quantify the amount of tape distortion involved, and produce a tracking offset value. The track following servo system can then position an operable servo reader over the tape with the compensating offset value applied.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for mitigating an effect of an inoperable servo reader on a tape drive, comprising:

a read and write head assembly, said read and write head assembly including a plurality of servo read elements, wherein at least one servo read element of said plurality of servo read elements is inoperable;

a tape, said tape including a plurality of servo tracks; and a track following servo system, said track following servo system coupled to said plurality of servo read elements, and operable to:

collect tape distortion information associated with said tape;

derive a track following offset value associated with said tape distortion information; and position at least one operable servo read element of said plurality of servo read elements proximal to at least one servo track of said plurality of servo tracks and with said track following offset value applied.

2. The system of claim 1, wherein said plurality of servo read elements comprises two servo read elements.

3. The system of claim 1, wherein said tape distortion information comprises a value N, and said track following offset value comprises N/2.

4. The system of claim 1, wherein said tape distortion information comprises position error signal (PES) data.

5. The system of claim 1, wherein said tape distortion information comprises position error signal (PES) data from at least one servo track of said plurality of servo tracks.

6. The system of claim 1, wherein said tape distortion information comprises position error signal (PES) data from separate servo readers of said plurality of servo readers to produce a composite PES value.

7. The system of claim 1, further comprising at least a second read and write head assembly, said second read and write head assembly including a second plurality of servo read elements, wherein said second read and write head assembly is operable to collect said tape distortion information associated with said tape.

8. The system of claim 1, wherein said plurality of servo read elements comprises a plurality of bumps, and one bump of said plurality of bumps includes said at least one inoperable servo read element.

9. The system of claim 1, wherein at least one servo track of said plurality of servo tracks comprises at least one of a magnetic track and an optical track.

10. A method for mitigating an effect of an inoperable servo reader on a tape drive, the method comprising the steps of:

collecting tape distortion information associated with a tape;

deriving a track following offset value associated with said tape distortion information; and positioning at least one operable servo read element of a plurality of servo read elements proximal to at least one servo track of a plurality of servo tracks and with said track following offset value applied.

11. The method of claim 10, wherein said plurality of servo read elements comprises two servo read elements.

12. The method of claim 10, wherein said tape distortion information comprises a value N, and said track following offset value comprises N/2.

13. The method of claim 10, wherein said tape distortion information comprises position error signal (PES) data.

14. The method of claim 10, wherein said tape distortion information comprises position error signal (PES) data from at least one servo track of said plurality of servo tracks.

15. The method of claim 10, wherein said tape distortion information comprises position error signal (PES) data from separate servo readers of said plurality of servo readers to produce a composite PES value.

16. A computer program product in a computer readable medium for use in a data processing system, for mitigating an effect of an inoperable servo reader on a tape drive, the computer program product comprising:

instructions for collecting tape distortion information associated with a tape;

instructions for deriving a track following offset value associated with said tape distortion information; and instructions for positioning at least one operable servo read element of a plurality of servo read elements proximal to at least one servo track of a plurality of servo tracks and with said track following offset value applied.

17. The computer program product of claim 16, wherein said plurality of servo read elements comprises two servo read elements.

18. The computer program product of claim 16, wherein said tape distortion information comprises a value N, and said track following offset value comprises N/2.

19. The computer program product of claim 16, wherein said tape distortion information comprises position error signal (PES) data.

20. The computer program product of claim 16, wherein said tape distortion information comprises position error signal (PES) data from at least one servo track of said plurality of servo tracks.

* * * * *